(12) United States Patent
Parker et al.

(10) Patent No.: US 7,086,290 B2
(45) Date of Patent: Aug. 8, 2006

(54) PRESSURE SENSOR WITH SINGLE DEPOSIT ADHESIVE

(75) Inventors: Gregory D. Parker, Charlotte, NC (US); Allen R. Clapper, Shelby, NC (US); Tuyen V. Pham, Shelby, NC (US); Gerald A. Stark, Shelby, NC (US); Michael P. Goodson, Shelby, NC (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/008,549

(22) Filed: Dec. 9, 2004

(65) Prior Publication Data

US 2006/0123916 A1    Jun. 15, 2006

(51) Int. Cl.
*G01F 9/00* (2006.01)
(52) U.S. Cl. ....................................................... 73/754
(58) Field of Classification Search .................. 73/715, 73/706, 721, 727, 754, 726; 438/459
See application file for complete search history.

(56) References Cited

U.S. PATENT DOCUMENTS

| | | | |
|---|---|---|---|
| 5,465,626 A * | 11/1995 | Brown et al. | 73/715 |
| 6,247,369 B1 * | 6/2001 | Chapman et al. | 73/726 |
| 6,422,206 B1 | 7/2002 | Wade et al. | 123/458 |
| 6,536,287 B1 | 3/2003 | Beekhuizen et al. | 73/718 |
| 6,722,205 B1 | 4/2004 | Bodin | 73/756 |
| 6,742,397 B1 | 6/2004 | Parker | 73/756 |
| 6,881,648 B1 * | 4/2005 | Chen et al. | 438/459 |

* cited by examiner

*Primary Examiner*—Jewel V. Thompson
(74) *Attorney, Agent, or Firm*—Kermit D. Lopez; Luis M. Ortiz

(57) ABSTRACT

Pressure sensor methods and systems are disclosed. In general, two micromachined die and a diaphragm for a pressure sensor can be provided. The two micromachined die can be embedded in a glass adhesive on a surface of the diaphragm, such that the glass adhesive possesses a large size relative to the two micromachined die. The large size of the glass adhesive creates a large planar target for placement of the two micromachined die upon the diaphragm, thereby providing a size difference between the glass adhesive and the two micromachined die thereby creates an optimum strain transfer, while maintaining stability for the pressure sensor.

17 Claims, 3 Drawing Sheets

T = TENSION
C = COMPRESSION

PRESSURE SENSOR WITH SINGLE DEPOSIT ADHESIVE

TECHNICAL FIELD

Embodiments are generally related to sensing methods and systems. Embodiments are also related to micromachined sensing devices. Embodiments are additionally related to hermetically sealed sensing devices. Embodiments are additionally related to pressure sensors.

BACKGROUND OF THE INVENTION

High-pressure sensors, including hermetically sealed pressure sensors, have found utility in a number of different applications. For example, high-pressure sensors are often employed in the area of automotive controls to obtain a measurement of certain pressure parameters such as engine oil pressure, transmission fluid pressure or brake pressure. High-pressure applications generally utilize an integral stainless steel housing and pressure port, which attaches to the pressure vessel by a threaded fitting, for example.

There currently exists a large demand for low cost hermetic pressure sensors for automotive, industrial, and other applications. One of the problems with conventional pressure sensors, particularly those involving the use of piezoelectric components, is that such devices are expensive to produce and subject to errors based on inaccurately combined sensor components.

The pressure sensor systems and methods described herein therefore overcome the aforementioned problems by providing an efficient methodology and system for creating a low cost hermetic pressure sensor, which can be efficiently fabricated at a low cost for automotive, industrial, and other applications.

BRIEF SUMMARY

The following summary is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide for improved sensor-based systems and methods.

It is another aspect of the present invention to provide for improved pressure systems and methods.

It is yet a further aspect of the present invention to provide for a pressure sensor system formed utilizing a single deposit glass adhesive for piezoelectric die placement thereof.

It is therefore another aspect of the present invention to provide for a hermetically sealed pressure sensor.

The aforementioned aspects of the invention and other objectives and advantages can now be achieved as described herein. Pressure sensor methods and systems are disclosed. In general, two micro-machined die and a diaphragm for a pressure sensor can be provided. The two micro-machined die can be embedded in a glass adhesive on a surface of the diaphragm, such that the glass adhesive possesses a large size relative to the two micro-machined die. The large size of the glass adhesive creates a large planar target for placement of the two micromachined die upon the diaphragm, thereby providing a size difference between the glass adhesive and the two micromachined die thereby creates an optimum strain transfer, while maintaining stability for the pressure sensor.

In general, the embodiments disclosed herein are directed toward low cost, high yield technique and system for creating a pressure sensor. The core of the pressure sensor can be, for example, a piezoresistive micromachined silicon die that is embedded in glass on a metal diaphragm. When the diaphragm is pressurized, it flexes. This flexing creates a strain field that is transferred through the glass and read by the two silicon sensing dice.

Embodiments are described in which two small piezoresistive die can be embedded in a single deposit of glass paste. The large size of the single paste deposit relative to the small size of the die creates a large planar target in which to place the die. This size difference keeps the die planar to the surface of the diaphragm, which is critical for optimum strain transfer.

The planar nature of the large single deposit of glass paste allows full embedding of all of the die edges, which aids in long-term stability. The large size of the single deposit also allows the die to be registered to the port instead of to two individual small glass deposits. The improved registration of the die to the port creates a more accurate sensor.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description of the invention, serve to explain the principles of the present invention.

DETAILED DESCRIPTION OF THE INVENTION

The particular values and configurations discussed in these non-limiting examples can be varied and are cited merely to illustrate embodiments of the present invention and are not intended to limit the scope of the invention.

Figure 1:
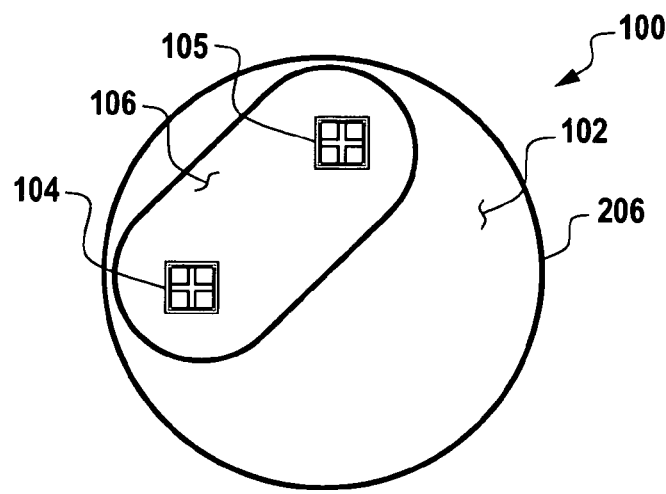
FIG. 1 illustrates a top view of a system that includes a port comprising a port surface, in accordance with a preferred embodiment.
Figure 2:
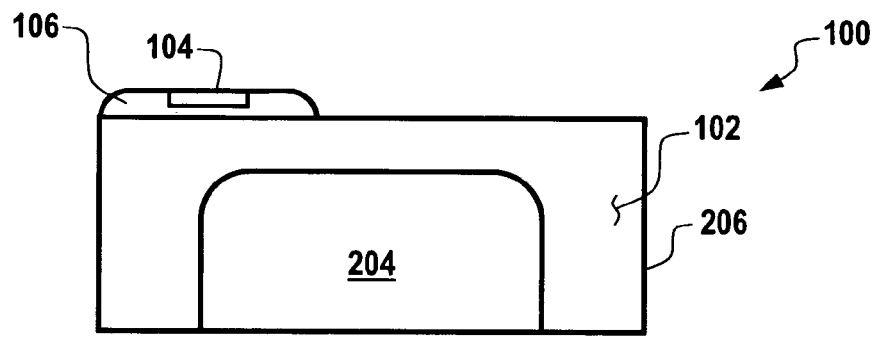
FIG. 2 illustrates a cross sectional view of system illustrated in FIG. 1, in accordance with a preferred embodiment.

FIG. 1 illustrates a top view of a system 100 that includes a port 206 comprising a port surface 100, in accordance with a preferred embodiment. In general, port surface 100 includes a diaphragm 102 upon which is located a single deposit glass adhesive 106 and two piezoresistive die 104, 105. FIG. 2 illustrates a cross-sectional view of system 100 illustrated in FIG. 1, in accordance with a preferred embodiment. Note that in FIGS. 1–3, identical or similar parts are generally indicated by identical reference numerals. As indicated in FIG. 2 a pressure port 206 is located below diaphragm 102. A pressure inlet 204 is formed from pressure port 206.

In general, piezoresistive die 104, 105 are embedded in a single deposit of glass adhesive 106, which may be, for example, in the form of a glass paste. The large size of the glass paste deposit 106 relative to the small size of the die 104, 105 creates a large planar target in which to place the die 104, 105. This size difference maintains the die 104, 105 planar to the surface of diaphragm 102, which is critical for optimum strain transfer. The planar nature of the large single deposit of glass paste 106 allows for the full embedment of all of the edges of die 104, 105, which aides in long term stability. The large size of the single deposit glass adhesive 106 also allows the die 104, 105 to be registered to the pressure port 206 instead of as two individual small glass deposits. The improved registration of the die 104, 105 to the port 206 creates a more accurate pressure sensor thereof.

Figure 3:
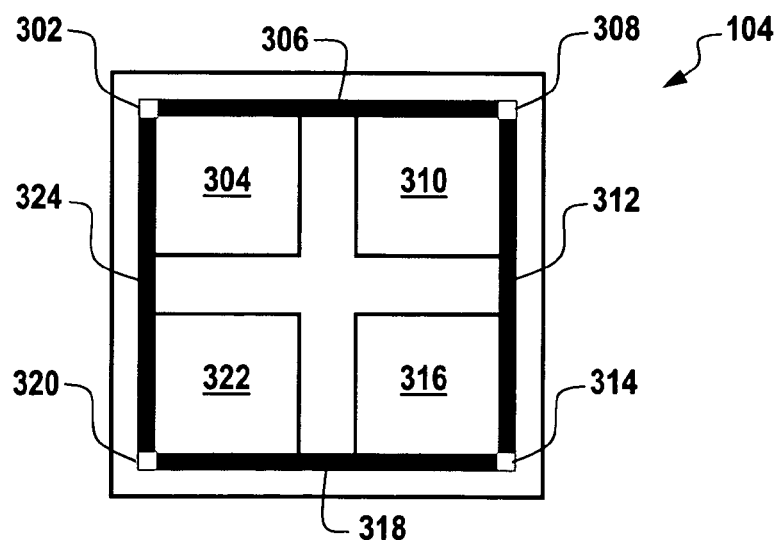
FIG. 3 illustrates a top view of a silicon die, which can be placed upon a diaphragm associated with the port surface indicated in FIGS. 1–2, in accordance with a preferred embodiment.

FIG. 3 illustrates a top view of a silicon die 104, which can be placed upon the diaphragm 102 associated with the surface of port 206 indicated in FIGS. 1–2, in accordance with a preferred embodiment. Note that silicon die 104 is depicted in FIGS. 1–2 and is generally identical in structure and shape to die 105. Die 104, 105 can be formed, for example, as 0.5×0.5×0.05 mm thick micromachined silicon blocks, depending upon design considerations.

Each die 104, 105 can be configured to contain a full Wheatstone bridge, including a plurality of piezoresistors 306, 312, 318, 324. The four piezoresistors 306, 312, 318, 324 depicted in FIG. 3, which are arranged in a Wheatstone bridge arrangement, can be respectively electrically attached via electrical connections 302, 308, 314, 320 at four respective corner intersections to four respective wirebond pads 304, 310, 316, 322. The piezoresistors 306, 312, 318, 324 change resistance when placed under strain. Such a resistance change can be either positive when the piezoresistors 306, 312, 318, 324 are placed in tension or negative when the piezoresistors 306, 312, 318, 324 are placed under compression.

Each die 104, 105 can be placed at 0 and 90 degrees on the metal diaphragm. The radial placement locations of the two die 104, 105 maximize the difference between circumferential strain minus radial strain at each die 104, 105 location during port pressurization of pressure port 206. This maximization of circumferential minus radial strain creates the maximum potential output from the die's Wheatstone bridge for a given diaphragm strain field. The die placement locations, from the center of the diaphragm to the center of the silicon die, can be, for example, 1.5 mm for a 5000-psi full-scale pressure sensor.

Figure 4:
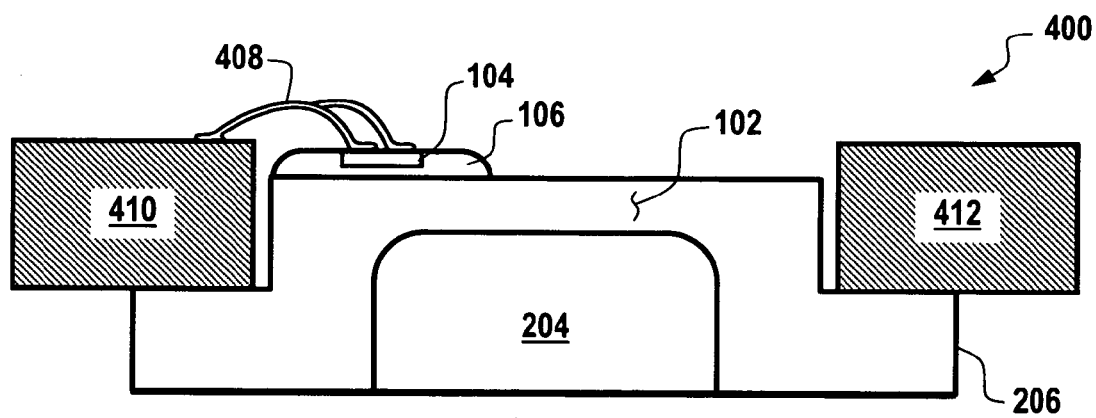
FIG. 4 illustrates an electrical implementation for a pressure sensor system in association with the components depicted in FIGS. 1–3 in accordance with a preferred embodiment.

FIG. 4 illustrates an electrical implementation for a pressure sensor system 400 in association with the components depicted in FIGS. 1–3 in accordance with a preferred embodiment. Note that in FIGS. 1–4, identical or similar parts can be indicated by identical reference numerals. Thus, the configuration depicted in FIGS. 1–3 can be adapted for use with system 400 depicted in FIG. 4. System 400 generally includes a circuit board portion 410 and 412 to which a pressure port 206 can be attached. Pressure inlet 204 is surrounded by pressure port 206 and located below diaphragm 102. The single deposit glass adhesive 106 is formed above diaphragm 102. Die 104 is formed in glass adhesive 106 as indicated earlier. Wirebonds 408 can be connected to the wirebond pads 304, 310, 316, 322 depicted in FIG. 3. Wirebonds 408 are electrically connected to circuit board portion 410. Note that a single circuit board can be formed from circuit board portions 410, 412.

Figure 5:
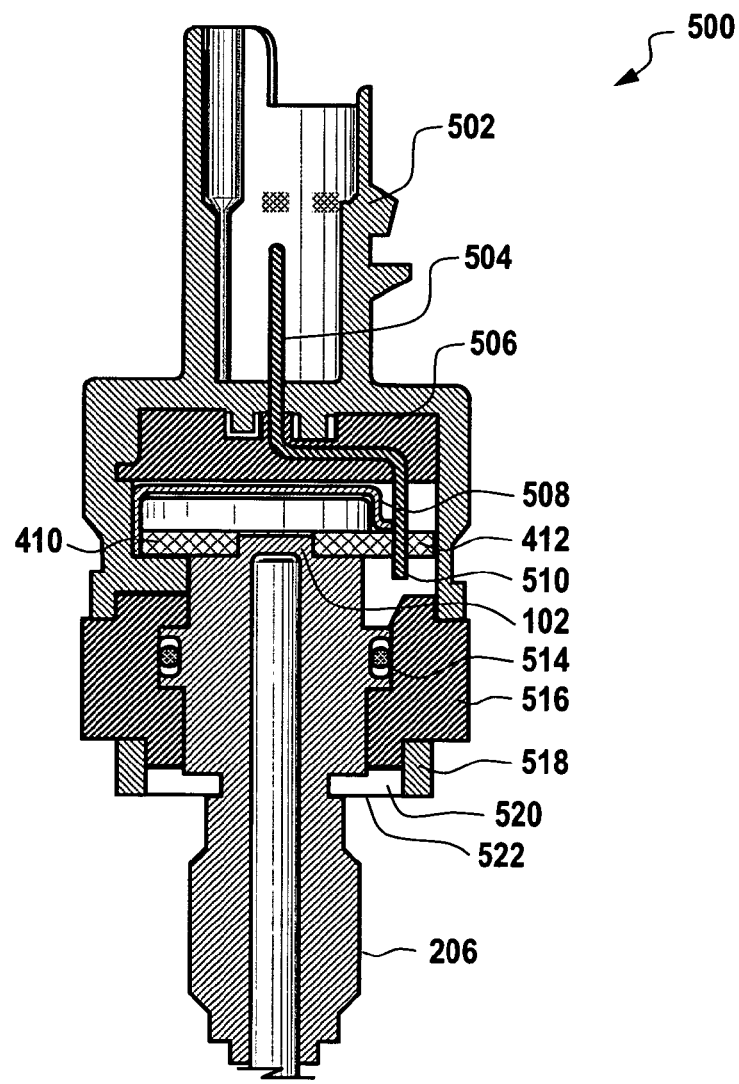
FIG. 5 illustrates a pressure sensor, which can be implemented in accordance with a preferred embodiment.

FIG. 5 illustrates a pressure sensor system 500, which can be implemented in accordance with a preferred embodiment. Note that in FIGS. 1–5, identical or similar parts or components can be indicated by identical reference numerals. System 400 of FIG. 4 and the components depicted in FIGS. 1–3 can therefore be adapted for utilization with system 500 illustrated in FIG. 5. System 500 can be implemented as a hermetically sealed device. Note that a solder joint 510 can be located within a connector shell 502 and can further connect to a terminal 504.

In general, system 500 can be configured to function as a hermetically sealed pressure sensor that includes pressure port 206, which is surrounded by an epoxy 522 and a retaining ring 520. A retaining ring protector 518 is also provided to protect retaining ring 520. A hex installation housing 516 can also be provided through which pressure port 206 is maintained. An O-ring 514 can also surround pressure port 206. A solder joint 510 is located within a connector shell 502 and connects to a terminal 504. A terminal holding plastic portion 506 is also located within connector shell 502. Additionally, an EMC cover 508 is located above diaphragm 102. Note that the glass and/or die are not depicted in FIG. 5.

In a typical 5000 psi full-scale pressure sensor, the metal pressure port is screw machined from 17-4H1150 stainless steel. It has a 3 mm inner diameter that allows pressure to reach the diaphragm. The diaphragm is 0.5 mm thick and the radius between the diaphragm and inner diameter is 1 mm. The diaphragm surface that the glass and die are placed onto is 5.5 mm in diameter.

At the die 104, 105 placement locations, the die 104, 105 are embedded in a single large glass deposit 106. This glass deposit 106 can be formed in the shape of two connected circles that may be, for example, approximately 2 to 2.5 mm in diameter. The single deposit 106 has a resulting oblong shape that goes well beyond the placement of both die 104, 105. The glass deposit 106 can be, for example, 0.25 mm in thickness. The large size of the glass relative to the die 104, 105 creates a large planar target in which to embed the die 104, 105. The large size of the glass also aids in die 104, 105 placements, because less exacting placement parameters for the glass 106 and die 104, 105 are necessary.

The glass 106 can be, for example, vitreous glass with solvents and binders. The vitreous glass can be provided as a lead borate glass. The solvents and binders keep the glass particles together during the stencil application of the glass paste onto the metal diaphragm 102. The binders also keep the glass particles together during transporting the unfired populated port 206. The glass properties are chosen such that the firing temperature is less than the degradation temperature of either the port 206 or the piezoresistive die 104, 105. The glass coefficient of thermal expansion is also chosen to be in a range that buffers the difference in coefficient of thermal expansions between the metal diaphragm and the die 104, 105.

The silicon die 104, 105 can be embedded in the unfired glass paste until their wirebond plane surfaces are flush with the surface of the unfired single deposit of glass paste 106. After the die 104, 105 are placed, the metal pressure port with integral diaphragm 102, the glass 106, and the die 104, 105 can be are taken to the temperature at which the glass melts. This process is often referred to as firing. The unit is then cooled to room temperature. At this point, the die 104, 105 can be permanently adhered to the diaphragm in the single deposit 106 of glass.

The fired single deposit paste now transfers the strain field developed on the diaphragm 102 of the pressure port 206 during pressurization to the silicon die 104, 105. The die 104, 105 can be wirebonded with four wirebonds 408 each to the circuit board formed by circuit portions 410, 412. The wirebonds 408, currently gold, transfer electrical signals from the wirebond pads 304, 310, 316, 322 on the silicon die to wirebond pads on the circuit board. Both die 104, 105 can be connected through routing on the circuit board formed by circuit portions 410, 412 so that their Wheatstone components are in parallel. Both die 104, 105 react to the strain field with a similar Wheatstone output upon pressurization of diaphragm 102.

The placement of the die 104, 105 is such that the circumferential piezoresistors go into tension and the radial piezoresistors go into compression during pressurization. Both of these strain inputs to the die 104, 105 unbalance the Wheatstone bridge. This unbalancing is repeatable with respect to pressure. This unbalancing of the Wheatstone bridge is the basis for creating the electrical signal for pressure sensor system 500. The level of die Wheatstone output for a 5000-psi sensor, for example, can be approximately 50 mV/V at a full-scale pressure input.

In a typical 5000-psi full-scale pressure sensor, for example, the metal pressure port 206 can be screw machined from stainless steel. Such a device may possess a 3 mm inner diameter that allows pressure to reach the diaphragm 102. The diaphragm 102 can be, for example, 0.5 mm thick and the radius between the diaphragm 102 and inner diameter can be approximately 1 mm. The diaphragm 102 surface that the glass 106 and die 104, 105 can be placed onto can be, for example, approximately 5.5 mm in diameter.

Figure 6:
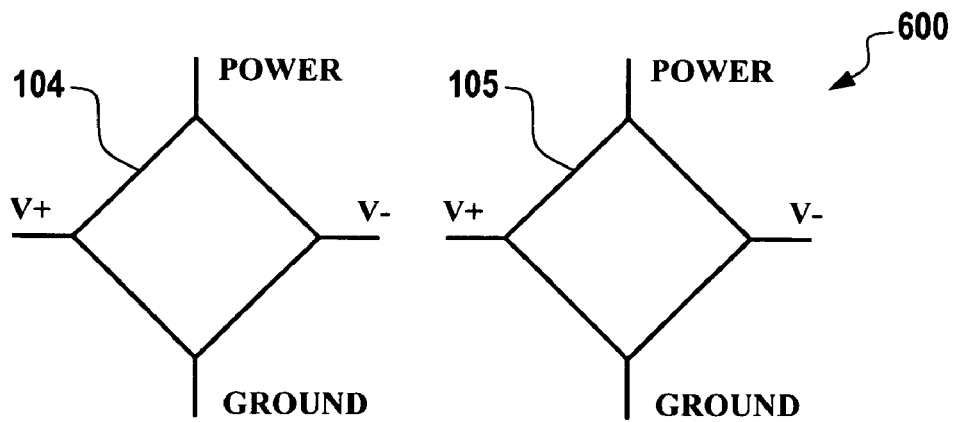
FIG. 6 illustrates a Wheatstone die schematic diagram in accordance with a preferred embodiment.

FIG. 6 illustrates a Wheatstone die schematic diagram in accordance with a preferred embodiment 600. Note that in FIGS. 1–6 identical or similar parts are generally indicated by identical reference numerals. Note that the level of imbalance is turned into a useful output for the end user through the use of an application specific integrated circuit (ASIC). The ASIC can provided with the Wheatstone components of the two silicon die through routing on the circuit board. The ASIC turns the Wheatstone imbalance into a repeatable, useful pressure related quantity for the end user.

The ASIC powers the die with roughly 1 Volt across the Wheatstone bridge of both die 104, 105 in parallel. Gain can be applied in the ASIC to the dies' Wheatstone output to get the output into a useful range for the end user. The ASIC typically can be programmed so that the pressure sensor output is 0.5 V relative to a 5 V input Voltage at zero pressure. The ASIC typically is programmed so that the pressure sensor output is 4.5 V relative to a 5V input Voltage at full scale pressure.

The ASIC can be utilized to maintain the output at these zero and full scale pressure targets within a tolerance band regardless of temperature over the sensor's full operating temperature. This 0.5V to 4.5 V correlation to pressure of the sensor output is often referred to as an analog output. The analog output allows the end user to correlate a sensor output Voltage to the pressure present in the port of the pressure sensors.

Figure 7:
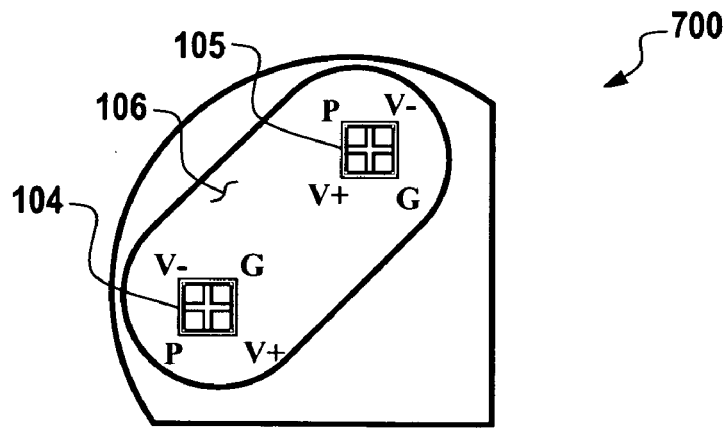
FIG. 7 illustrates a diagram illustrating die layout on the diaphragm in accordance with one embodiment.
Figure 8:
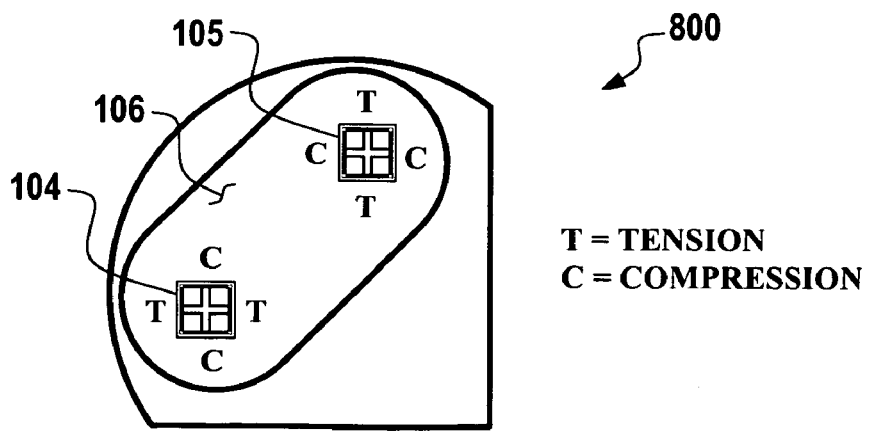
FIG. 8 illustrates a diagram depicting the reaction to full-scale pressurization in accordance with one embodiment.

FIG. 7 illustrates a diagram illustrating die layout 700 on the diaphragm 102 in accordance with one embodiment. FIG. 8 illustrates a diagram depicting the reaction to full scale pressurization in accordance with one embodiment. Note that in FIGS. 7–8 identical parts or components are generally indicated by identical reference numerals.

Note that the analog output of the ASIC can be presented to the end user through a three pin connector comprised of three terminals. One terminal provides a regulated 5 Volt power supply to the ASIC. A second terminal provides a ground to the ASIC. The third terminal provides the end user with the analog output of the ASIC. This analog output can be correlated to the input pressure that the sensor's diaphragm is presented with through the pressure port.

It can be appreciated that various other alternatives, modifications, variations, improvements, equivalents, or substantial equivalents of the teachings herein that, for example, are or may be presently unforeseen, unappreciated, or subsequently arrived at by applicants or others are also intended to be encompassed by the claims and amendments thereto.

What is claimed is:

1. A pressure sensor method, comprising the steps of:
providing at least two micromachined die and a diaphragm for a pressure sensor, wherein said at least two micromachined die comprises silicon or a piezoelectric material; and
embedding said at least two micromachined die in a glass adhesive on a surface of said diaphragm, wherein said glass adhesive possesses a large size relative to said at least two micromachined die, such that said large size of said glass adhesive creates a large planar target for placement of said at least two micromachined die upon said diaphragm, thereby providing a size difference between said glass adhesive and said at least two micromachined die that creates an optimum strain transfer thereof and maintains stability for said pressure sensor.

2. The method of claim 1 further comprising the step of configuring said piezoelectric material to comprise a plurality of piezoresistors, wherein each piezoresistors thereof is located proximate to an associated wirebond pad, and in turn to an electrical connection to a circuit board thereof.

3. The method of claim 1 further comprising the step of configuring said at least two micromachined die to comprise a full Wheatstone bridge composed of four piezoresistors thereof which are electrically attached at four corners of said Wheatstone bridge to four wirebond pads.

4. The method of claim 1 wherein said four piezoresistors change resistance when placed under strain, such that a resistance change thereof is positive when said four piezoresistors are placed in tension or negative when said four piezoresistors are placed under compression.

5. The method of claim 1 further comprising the step of locating said at least two micromachined die upon said diaphragm, wherein at least one micromachined die is placed at 0 degrees on said diaphragm and at least one other micromachined die is placed at 90 degrees on said diaphragm.

6. The method of claim 1 further comprising the step of forming said diaphragm from metal and wherein said glass adhesive comprises vitreous glass in association with at least one solvent and at leas one binder.

7. The method of claim 1 further comprising the steps of:
establishing a pressure port below said diaphragm, wherein said pressure port is associated with said pressure sensor; and
forming a pressure inlet from said pressure port and locating said pressure inlet below said diaphragm.

8. A pressure sensor method, comprising the steps of:
providing at least two micromachined die and a diaphragm for a pressure sensor;
establishing a pressure port below said diaphragm, wherein said pressure port is associated with said pressure sensor;
forming a pressure inlet from said pressure port and locating said pressure inlet below said diaphragm;
embedding said at least two micromachined die in a glass adhesive on a surface of said diaphragm, wherein said glass adhesive comprises a vitreous glass in association with at least one solvent and at least one binder; and
selecting a glass property associated with glass adhesive such that a firing temperature thereof is less than a degradation temperature of said at least two micromachined die or said pressure port, wherein said glass adhesive possesses a large size relative to said at least two micromachined die, such that said large size of said glass adhesive creates a large planar target for placement of said at least two micromachined die upon said diaphragm, thereby providing a size difference between said glass adhesive and said at least two micromachined die that creates an optimum strain transfer thereof and maintains stability for said pressure sensor.

9. A pressure sensor system, comprising:
at least two micromachined die and a diaphragm for a pressure sensor, wherein said at least two micromachined die comprises silicon or a piezoelectric material; and
a glass adhesive, wherein said at least two micromachined die are embedded in said glass adhesive on a surface of said diaphragm, wherein said glass adhesive possesses a large size relative to said at least two micromachined die, such that said large size of said glass adhesive creates a large planar target for placement of said at least two micromachined die upon said diaphragm, thereby providing a size difference between said glass adhesive and said at least two micromachined die that creates an optimum strain transfer thereof and maintains stability for said pressure sensor.

10. The system of claim 9 wherein said piezoelectric material comprises a plurality of piezoresistors, wherein each piezoresistors thereof is located proximate to an associated wirebond pad, and in turn to an electrical connection to a circuit board thereof.

11. The system of claim 9 wherein said at least two micromachined die comprise a full Wheatstone bridge composed of four piezoresistors thereof which are electrically attached at four corners of said Wheatstone bridge to four wirebond pads.

12. The system of claim 9 wherein said four piezoresistors change resistance when placed under strain, such that a resistance change thereof is positive when said four piezoresistors are placed in tension or negative when said four piezoresistors are placed under compression.

13. The system of claim 9 further comprising:
a pressure port located below said diaphragm, wherein said pressure port is associated with said pressure sensor; and
a pressure inlet formed from said pressure port and located said pressure inlet below said diaphragm.

14. The system of claim 13 wherein said glass adhesive comprises vitreous glass in association with at least one solvent and at least one binder.

15. The system of 14 further comprising a glass property associated with said glass adhesive, wherein said glass property comprises a firing temperature thereof that is less than a degradation temperature of said piezoelectric die or said pressure port.

16. The system of claim 9, further comprising:
a pressure port located below said diaphragm, wherein said pressure port is associated with said pressure sensor and wherein said diaphragm comprises a metal;
a pressure inlet formed from said pressure port and located said pressure inlet below said diaphragm, wherein said glass adhesive comprises vitreous glass in association with at least one solvent and at least one binder; and
a glass property associated with said glass adhesive, wherein said glass property comprises a firing temperature thereof that is less than a degradation temperature of said piezoelectric die or said pressure port.

17. The system of claim 9 further comprising:
a pressure port located below said diaphragm, wherein said pressure port is associated with said pressure sensor and wherein said diaphragm comprises a metal;
a pressure inlet formed from said pressure port and located said pressure inlet below said diaphragm, wherein said glass adhesive comprises vitreous glass in association with at least one solvent and at least one binder;
a glass property associated with said glass adhesive, wherein said glass property comprises a firing temperature thereof that is less than a degradation temperature of said piezoelectric die or said pressure port; and
wherein said at least two micromachined die are located upon said diaphragm, such that at least one micromachined die is placed at 0 degrees on said diaphragm and at least one other micromachined die is placed at 90 degrees on said diaphragm.

* * * * *